Patented July 19, 1932

1,867,965

UNITED STATES PATENT OFFICE

JOSEPH GEORGE DAVIDSON, OF YONKERS, NEW YORK, AND HAROLD FOSTER ROBERTSON, OF CORAOPOLIS, PENNSYLVANIA, ASSIGNORS TO CARBIDE & CARBON CHEMICALS CORPORATION, A CORPORATION OF NEW YORK

CALCIUM CARBIDE CAKE AND METHOD OF MAKING THE SAME

No Drawing.   Application filed January 24, 1930.   Serial No. 423,258.

Our invention relates to improvements in the forming of cakes or blocks of calcium carbide in a form suitable for use in acetylene generators and the like.

One of the objects of our invention is to produce a coherent cake or block of calcium carbide in a form suitable for use in an acetylene generator which will not cause foaming in the generator and which will give an inoffensive residue. Another object of our invention is to reduce the amount of binding material required. A further object of our invention is to produce a cake which is less subject to air slaking than those known heretofore. These and other objects of our invention will be evident from the following specification.

It is well known that for certain types of acetylene generators it is desirable to use calcium carbide formed into cakes or blocks. These blocks are of various shapes and sizes, a flat cylinder two to four inches in diameter and about three inches thick being a representative shape. The common method of forming the cakes is to use a binder of sugar and sulfur. This is objectionable because the sludge formed in the generator has an unpleasant odor and color, apparently due to the presence of the sulfur. The sludge is sticky and hardens on drying, making it difficult to remove. To remedy this, it has been proposed to use other binders, such as resins, but hitherto this has proved unsuccessful. Various resins have been tried in the past but difficulties have been encountered in their use, foaming in the generator being one of the most serious. This, we believe, is due to the fact that the acid of the resin reacts with calcium hydroxide, formed during the generation of the acetylene, giving a soap which causes the foaming. Other objections to some of the resins previously tried were that they so coated the grains of calcium carbide that the water did not reach the carbide, and that the resins were soluble in the mineral oil used as a coating for the cakes to prevent air slaking.

We have found that polymerized vinyl ester resins are not subject to these objections when used as a binder. These resins do not cause a permanent foam but are precipitated as a sediment, they are insoluble in the oil used for coating the cake, they do not waterproof the grains, the color and odor of the resulting sludge is inoffensive, and it does not harden.

Resins suitable for use as binders are formed by polymerizing many vinyl compounds, including the vinyl esters and particularly vinyl acetate and vinyl chloride. Before or during polymerization, the vinyl compound may be mixed with other polymerizable substances, such as aldehydes and olefine oxides. Polymerization may be effected by the methods disclosed in the prior art, for example by using heat, or ultra-violet radiation, or both, and a catalyst.

We have found a resin especially suitable for use as a binder may be formed by mixing vinyl chloride and vinyl acetate and polymerizing them together. Ordinarily we prefer to use about 80 parts of vinyl chloride and 20 parts of vinyl acetate, but other proportions may be used. It is sometimes desirable to decrease the amount of chloride to make the resulting resin more permeable to water. The resulting resin is soluble in various solvents; we have found toluene satisfactory.

To form the cake we have found the following method satisfactory. The calcium carbide is first ground. As an indication of the fineness of grinding we give a screen analysis of a representative sample of the ground carbide. This analysis was made with square mesh wire cloth screens.

Between 0.17" and 0.06" 61.5%.
Between 0.06" and 0.0487" 17.5%.
Between 0.0487" and 0.034" 12.5%.
Between 0.034" and 0.0173" 7.5%.
Below 0.0173" 1.0%.

The above analysis, while representative of a typical sample, is not to be understood as a limitation on our invention. The ground carbide is mixed with a solution of the above described polymerized vinyl resin in toluene, the amount being such as to give from 2 to 6 parts of resin per 100 parts of carbide, preferably about four parts. The mixing is such that all the grains are wetted and coated with the resin solution. The toluene is partially evaporated, preferably in such a manner that it may be recovered. When practically all the solvent has evaporated the mix is moulded, in a suitable mould, under pressure, into cakes of the required size and shape. These cakes are dried and, after coating with mineral oil in the usual manner, they are ready for use in an acetylene generator.

Instead of dissolving the resin in a solvent, we may mix the dry resin with dry calcium carbide and mould the cakes under pressure and a heat of about 200° F. We may also use the vinyl resin with other resins or gums or with sugar.

In order to change the density, strength, porosity or other characteristics of these resin bonded cakes we may use inert fillers, such as lime, ground silica, straw, or wood flour, with the calcium carbide.

We claim:

1. Method of forming carbide cakes containing a preponderance of carbide which comprises mixing calcium carbide with a solution of a polymerized vinyl ester, partially drying the mix, forming it into cakes and drying the cakes.

2. Method of forming carbide cakes containing a preponderance of carbide which comprises mixing calcium carbide with a solution of a polymerized vinyl ester in toluene, partially drying the mix, forming it into cakes and drying the cakes.

3. A coherent molded body adapted to be reacted upon by water to form acetylene gas, said body comprising calcium carbide in preponderating proportion and a binding agent comprising a polymerized vinyl ester.

4. A coherent molded body adapted to be reacted upon by water to form acetylene gas, said body comprising calcium carbide in preponderating proportion and a binding agent comprising the product of the conjoint polymerization of a mixture of vinyl esters.

5. A carbide cake comprising 100 parts of ground calcium carbide and substantially 2 to 6 parts of a binding agent, said binding agent comprising the product formed by the conjoint polymerization of about 80 parts vinyl chloride and about 20 parts vinyl acetate.

6. A carbide cake adapted to be reacted upon by water to form acetylene gas, said cake comprising ground calcium carbide in preponderating proportion, an inert filler and a binding agent comprising a polymerized vinyl ester.

In testimony whereof, I affix my signature.

JOSEPH GEORGE DAVIDSON.

In testimony whereof, I affix my signature.

HAROLD FOSTER ROBERTSON.